United States Patent [19]

Polan

[11] Patent Number: 4,830,115

[45] Date of Patent: May 16, 1989

[54] VALVE ASSEMBLY FOR SPRINKLER HEAD

[75] Inventor: George S. Polan, North Wales, Pa.

[73] Assignee: Central Sprinkler Corporation, Ansdale, Pa.

[21] Appl. No.: 924,005

[22] Filed: Oct. 28, 1986

[51] Int. Cl.$^4$ .............................................. A62C 37/08
[52] U.S. Cl. ...................................... 169/38; 137/242; 251/332; 251/333
[58] Field of Search ...................... 169/37–42, 169/90, 91; 251/332, 333; 137/242, 244

[56] References Cited

U.S. PATENT DOCUMENTS

| | | | |
|---|---|---|---|
| H 121 | 9/1986 | Pieczykolan | 169/37 |
| 2,163,472 | 6/1939 | Shimer | 251/333 X |
| 2,213,998 | 9/1960 | Sifkovitz | 137/242 |
| 2,528,063 | 10/1950 | Loepsinger | 169/38 |
| 2,989,124 | 6/1961 | Lapp et al. | 169/37 X |
| 3,200,839 | 8/1965 | Gallagher | 251/332 X |
| 4,121,665 | 10/1978 | Woycheese | 169/38 |
| 4,217,961 | 8/1980 | Wotton | 169/41 |
| 4,648,459 | 3/1987 | Pieczykolan | 169/38 |

FOREIGN PATENT DOCUMENTS

| | | | |
|---|---|---|---|
| 2225215 | 12/1972 | Fed. Rep. of Germany | 169/38 |
| 1322179 | 7/1973 | United Kingdom | 169/38 |
| 1349935 | 4/1974 | United Kingdom | 169/37 |
| 1350991 | 4/1974 | United Kingdom | 169/41 |

Primary Examiner—Joseph F. Peters, Jr.
Assistant Examiner—Paul E. Salmon
Attorney, Agent, or Firm—Panitch, Schwarze, Jacobs and Nadel

[57] ABSTRACT

A valve assembly for use in a sprinkler head comprising a valve seat having a generally frusto-conical surface configuration and an annular rib, a flanged valve member in sealing engagement with said annular rib and having a depending, radially inwardly spaced surface which in cooperation with said annular rib and surface configuration forms a partially enclosed space in which a resilient O-ring is captively held in compressive engagement between the valve seat and valve member.

6 Claims, 2 Drawing Sheets

VALVE ASSEMBLY FOR SPRINKLER HEAD

BACKGROUND OF THE INVENTION

Sprinkler heads for discharging a fire-quenching fluid are generally required to withstand long periods of non-use. During periods of prolonged non-use, the sprinker head is subject to degradation by exposure to both air and water contaminants which can seriously degrade seal integrity. In severe cases, such conditions can result in seal failure with resultant water damage or even more seriously, in-operation of the sprinkler head. An additional factor which tends to further degrade seal integrity is corrosion which occurs at metal interfaces. This often results from galvanic action produced at the interface of dissimilar metals in the presence of an electrolyte, such as salt-containing water.

Accordingly, it is an object of the present invention to provide a novel seal assembly which minimizes both corrosion and contamination build up while concomitantly providing a seal assembly which is self-adjusting to water pressure transients, and which exhibits increased seal compression under such conditions.

SUMMARY OF THE INVENTION

This invention is directed to a valve assembly for use in a sprinkler head and which is designed both to minimize and protect against the contamination of the valve sealing surface and to provide a seal having optimum integrity under high-pressure loading. The seal is structured to minimize metal to metal contact by the provision of an annular rib on the surface of the valve seat. This surface, in the preferred embodiment, is of frusto-conical configuration. The valve member which serves as a closure for the sprinkler head passageway is in the form of a saddle provided with a radially extending flange. The flange is held in sealing engagement with the annular rib by a frangible bulb or other latching arrangement well known in the art. Caged between the inclined surface of the valve seat and the valve member or saddle is a resilient O-ring held in compressive engagement between them. The construction is such that the O-ring is in fluid communication with the high-pressure side of the sprinkler head system. When the pressure increases the O-ring is further compressed or wedged into its containment area enhancing the integrity of the seal, thereby preventing seal leakage and consequent water damage occasioned by such conditions.

More particularly, the invention is concerned with a low pre-load valve assembly to be used in conjunction with a sprinkler head which minimizes metal to metal contact between the valve closure member and valve seat, thereby reducing the sealing contact area subject to corrosion. Maximum seal integrity is insured under adverse operating conditions through provision of a confined O-ring wedged between the valve seat and valve closure member on both the low pressure and high pressure sides of the sprinkler system. The construction of the containment area of the O-ring insures that pressure surges act to wedge the O-ring more firmly into sealing engagement between the valve seat and valve closure member.

The preferred form of valve assembly comprises a frusto-conical valve seat having formed on its inclined surface a projecting annular rib. Disposed in overlying sealed engagement with the annular rib is the radially extending flange of a valve member. The valve member is constructed with an inwardly spaced depending annular shoulder which in cooperation with said flange, annular rib and valve seat forms a containment area in which a resilient O-ring is wedged in compressive engagement between the valve member and the inclined surface of the valve seat on both the low pressure and high pressure sides of the system. The valve member is dimensioned so that when its radially extending flange is positioned on the annular rib of the valve seat, the depending surface of the valve member does not contact the inclined surface of the valve seat, but forms with that surface a narrow annular opening in communication with the O-ring containment area. By this construction, the containment area is maintained in fluid communication with the high pressure side of the system. In the event of a pressure surge, this arrangement results in the O-ring being compressed into tighter confinement between the valve seat and valve closure member. As the pressure increases, so does the O-ring squeeze ratio.

For the purpose of illustrating the invention, there is shown in the drawings a form which is presently preferred; it being understood, however, that this invention is not limited to the precise arrangements and instrumentality shown.

DETAILED DESCRIPTION

Figure 1:
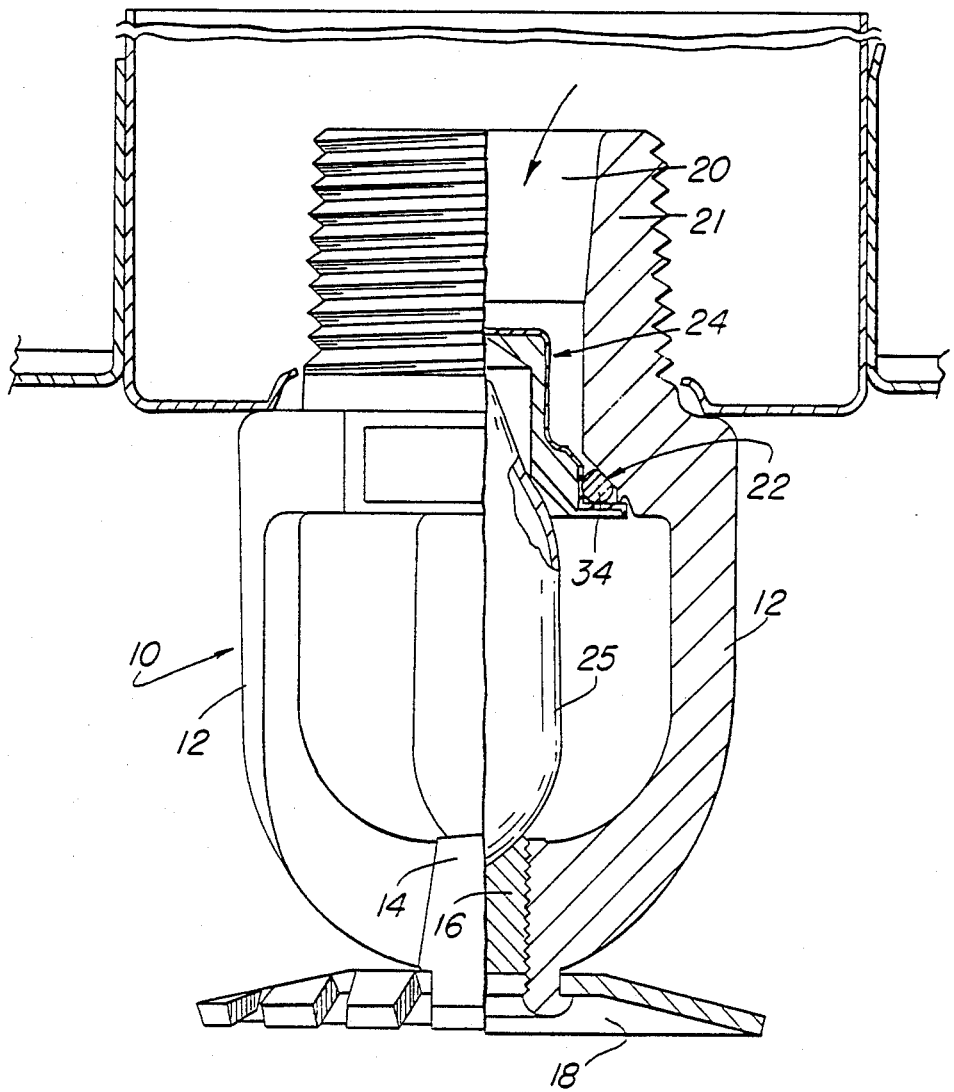
FIG. 1 is an elevational view, partially in section, of a sprinkler head embodying a preferred form of the present invention.
Figure 2:
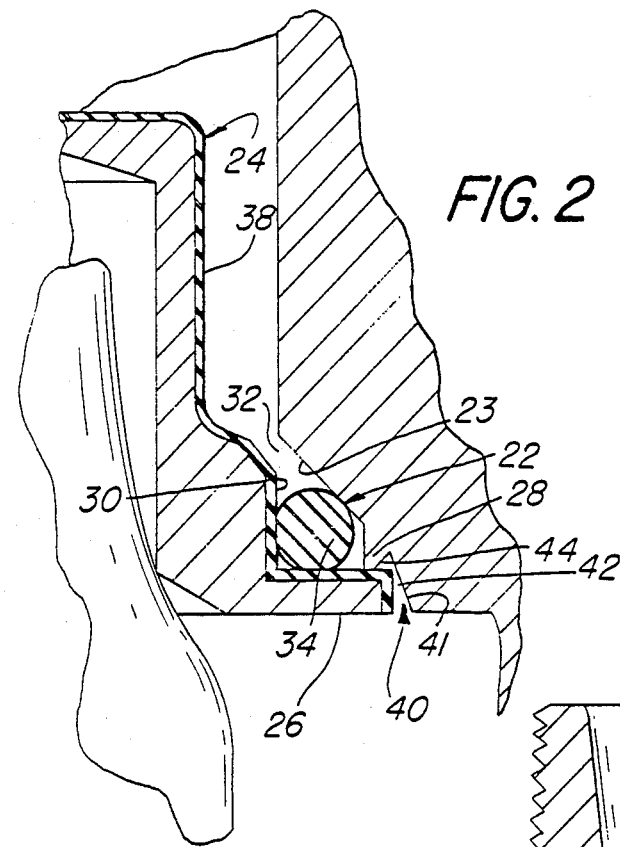
FIG. 2 is an enlarged sectional view of the saddle and sprinkler head frame construction.

Referring to the drawings in detail, wherein like numerals indicate like elements there is shown in FIG. 1 an embodiment of the valve assembly of the present invention incorporated in a sprinkler head designated generally as 10. The sprinkler head frame includes a pair of arms 12 integral with a collar 14 provided with a threaded passage which retains a setscrew 16 for adjusting the valve preload. Attached to the setscrew as an integral part thereof is the deflector plate 18. The sprinkler head frame is provided with a flow passage 20 within an externally threaded stem 21 which is adapted to be threadably engaged to a pressurized fluid conduit (not shown) as is well known in the art. Pressurized fluid, typically water, enters the flow passage 20 as indicated by the arrow in FIG. 1. The flow passage 20 terminates in a valve seat 22 of generally frusto-conical configuration as best seen in FIG. 2. A valve closure member or saddle 24 closes passageway 20 and is held in closed position by means of a thermally responsive element such as a frangible bulb 25 containing a heat expansible fluid.

The saddle has an annular flange 26 which is seated on an annular rib or ridge 28 formed on the inclined or frusto-conical surface 23 of the valve seat 22. The saddle is also provided with an inwardly spaced depending annular shoulder 30. The construction of the saddle is such that when the flange 26 is positioned on the annular rib 28 no portion of the saddle contacts the inclind surface 23, the dimensioning being such as to leave a restricted annular opening 32 between the valve seat and shoulder 30. An O-ring 34, preferably made of Teflon (Trademark) is captured under compression within the containment area defined by the annular rib 28, saddle 24 and surface 23. As seen in FIG. 2, the O-ring is maintained under resilient compression against the valve seat 22 by the saddle 24. In addition to providing a highly effective seal, the arrangement insures quick release of the saddle upon fracture of the frangible bulb 25.

For optimum peel-off effect upon fracture of the bulb 25, the taper of the inclined surface 23 of the valve seat is preferably set at 45°. This also insures optimum seal integrity. To minimize long-term adhesion the upwardly presented surfaces of the saddle, as viewed in FIG. 2, are provided with a Teflon coating 38.

When sprinkler systems remain inactive for any period of time. Their surfaces become encrusted with contaminants, often resulting in a defective seal. To avoid this problem, applicant has devised the seal construction shown in FIG. 2, to produce a self-shearing action in the event the area 40 becomes encrusted with contaminants. The inner edge 42 of flange 26 and edge portions of annular rib 28 act upon movement of the saddle 24 by water-pressure transients, to shear contaminant encrustation from exposed surfaces.

Referring to FIG. 2, it will be seen that as pressure surges act on the saddle 24, it tends to oscillate in a generally vertical direction such that the saddle edge acting against the inclined surface of the pilot groove 40 and the apex of the annular rib 28 acting on the undersurface of the saddle flange tend to shear away any built-up encrustation. Moreover, by minimizing the metal-to-metal contact area, the problem of corrosion build-up is substantially reduced.

Figure 3:
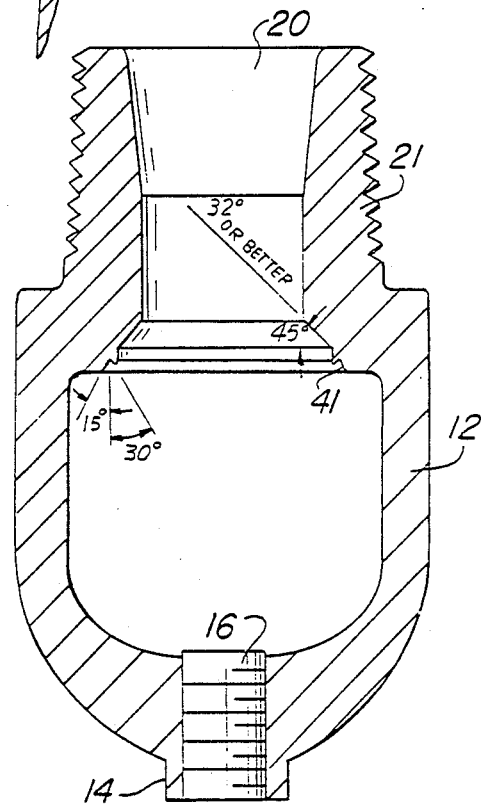
FIG. 3 is a sectional view of the sprinkler frame.

A preferred embodiment of the frame construction embodying this unique design is shown in FIG. 3. The tolerance of critical parts and the preferred angularity of the valve seat is detailed in this figure.

The V-shaped groove 40 formed between the frame wall and the radially outer inclined surface 44 of the annular rib 28 permits the saddle to self-align on the valve seat. As seen in FIG. 3, the preferred construction of alignment groove 40 is such that the radially outermost face is inclined at an angle of 15° with the vertical and the radially innermost face 44, which also forms one surface of the annular rib 28, is inclined at an angle of 30° with the vertical. The saddle 24 when placed over the valve seat is automatically aligned by groove surface 41 which acts as a pilot surface thereby facilitating assembly of the unit.

The present invention may be embodied in other specific forms without departing from the spirit or essential attributes thereof, and, accordingly, reference should be made to the appended claims, rather than to the foregoing specification, as indicating the scope of the invention.

I claim:

1. A valve assembly for use with a sprinkler head having a fluid passage for receiving a fire quenching fluid, comprising:
   a valve seat having a radially inwardly inclined shaped surface and an annular rib;
   a valve member in sealing engagement only with said annular rib and forming, in association with said rib and shaped surface, a partially enclosed space;
   a resilient compressible member captively disposed within said space and wedged between said valve member and said valve seat;
   said valve seat being provided with an inwardly directed, inclined aligning surface spaced radially outwardly of said annular rib whereby said valve member self-aligns on said annular rib;
   said valve member having a radially extending flange in sealing engagement with said annular rib and an inwardly spaced depending body portion of annular configuration forming, in association with said flange, annular rib and valve seat, a partially enclosed space having a restricted opening in fluid communication with said fluid passage; and
   the outer edge of said flange being positioned sufficiently close to said aligning surface that it acts upon movement of said valve member by pressure transients produced by fluid in said fluid passage to remove build up of contaminant encrustation from said aligning surface.

2. A valve assembly comprising:
   a frame having a fluid passage and a valve seat provided with a frusto-conical surface configuration, and an annular rib;
   a valve member disposed in sealing engagement only with said annular rib and forming, with said annular rib and surface configuration, a partially enclosed space in fluid communication with said fluid passage;
   a resilient compressible member captively held within said partially enclosed space and wedged between said valve member and said valve seat;
   said valve seat being provided with an inwardly directed, inclined aligning surface spaced radially outwardly of said annular rib whereby said valve member self-aligns on said annular rib;
   said valve member having a radially extending flange in sealing engagement with said annular rib and an inwardly spaced depending body portion of annular configuration forming, in association with said flange, annular rib and valve seat, a partially enclosed space having a restricted opening in fluid communication with said fluid passage; and
   the outer edge of said flange being positioned in sufficiently close proximity to said aligning surface that it acts upon movement of said valve member by pressure transients produced by fluid in said fluid passage to remove build up of contaminant encrustation from said aligning surface.

3. A valve assembly in accordance with claims 1 or 2 in which said resilient compressible member comprises an O-ring.

4. A valve assembly in accordance with claims 1 or 2 in which fluid contacting surfaces of said valve member are coated by a material having low long term adhesion.

5. A valve assembly in accordance with claim 4 in which said material is Teflon.

6. A valve assembly in accordance with claims 1 or 2 in which said annular rib acts upon movement of said valve member by pressure transients produced by fluid in said fluid passage to remove corrosion encrustation from the interface between said valve member and said annular rib.

* * * * *